United States Patent [19]

Mattsson

[11] 3,847,440
[45] Nov. 12, 1974

[54] WHEEL FITTING DEVICE
[75] Inventor: Bertil Mattsson, Goteborg, Sweden
[73] Assignee: HEA Rehab AB, Groteberg, Sweden
[22] Filed: May 29, 1973
[21] Appl. No.: 364,243

[30] Foreign Application Priority Data
May 30, 1972 Sweden.............................. 7059/72

[52] U.S. Cl......... 301/1, 180/DIG. 3, 280/242 WC, 297/DIG. 4
[51] Int. Cl............................................ B60b 37/00
[58] Field of Search ....... 301/1, 6 V, 111, 112, 114; 180/DIG. 3; 188/2 F; 280/242 WC, 211, 249; 297/DIG. 4

[56] References Cited
FOREIGN PATENTS OR APPLICATIONS
1,943,127  5/1970  Germany ...................... 180/DIG. 3

Primary Examiner—M. Henson Wood, Jr.
Assistant Examiner—Victor N. Sakran
Attorney, Agent, or Firm—Holman & Stern

[57] ABSTRACT

In wheel chairs and similar transport means, it is desirous that each wheel be provided with a brake mechanism and be so fitted that it may easily be removed for exchange in the case of a possible puncture or the like.

This is obtained in that the wheel is non-rotatably but disconnectedly fitted to one end of a wheel shaft which is rotatably supported in a bearing, with the brake mechanism being non-rotatably connected to the opposite end of the wheel shaft. By this arrangement, the wheel may easily be removed from the wheel chair whereas the bearing, the brake mechanism and the wheel shaft are left in position.

4 Claims, 1 Drawing Figure

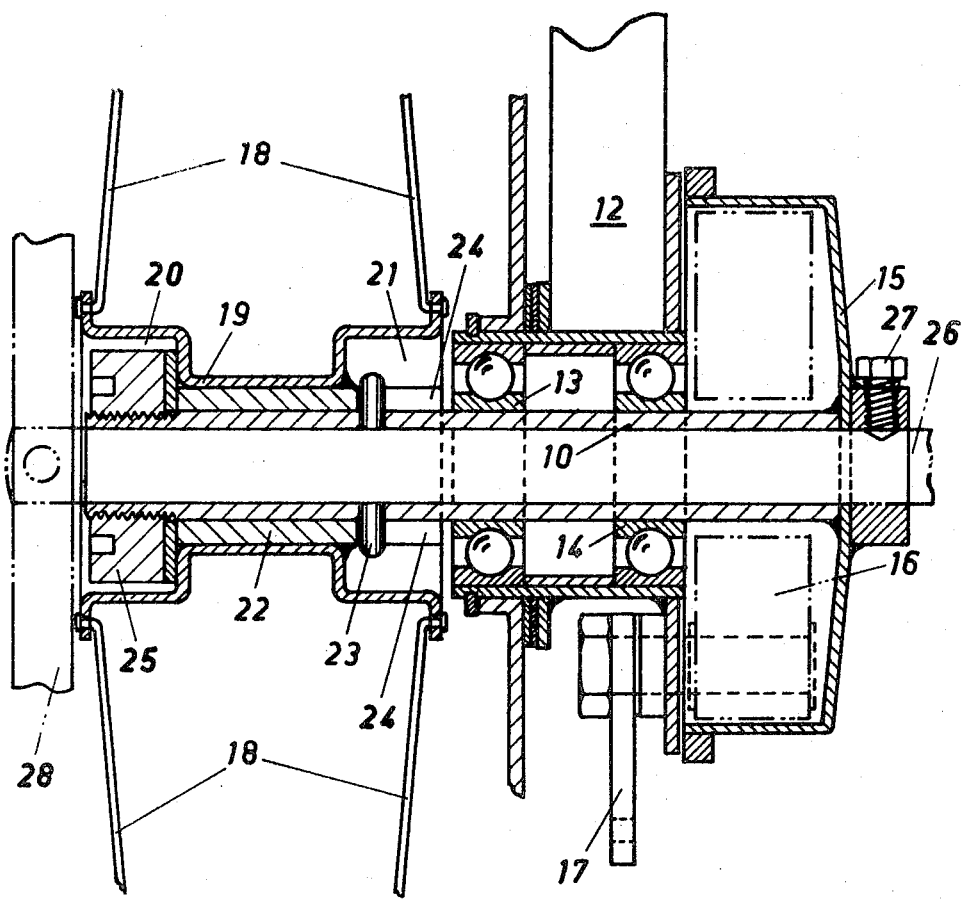

WHEEL FITTING DEVICE

BACKGROUND TO THE INVENTION

The present invention relates to a device which makes it possible in a simple way to detachably fit a brake-provided wheel to a wheel chair or a similar means of transport. The wheels generally are provided with pneumatic tires and in the case of a possible puncture, is it necessary that the wheel can be removed quickly. It should be possible to do this while a patient is still sitting in the chair, and in larger nursing homes there should be spare wheels on hand to make possible an immediate exchange. During transport of the chair, it is also desirable that the wheels can be removed from the chair.

SUMMARY OF THE INVENTION

A very simple fitting device is obtained according to the invention in that the wheel shaft is fixedly carried in a bearing provided in the load-carrying body of the wheel chair and adapted to carry on its end facing towards the center of the chair a brake mechanism, while its opposite end is non-rotatably but detachably connected to the wheel hub.

BRIEF DESCRIPTION OF THE DRAWING.

The invention will herebelow be described with reference to the accompanying drawing, in which the single FIGURE is a longitudinal section through the shaft with adjacent portions of the chair body, the wheel and the brake drum.

DESCRIPTION OF THE PREFERRED EMBODIMENT.

A shaft 10 is tubular and is carried in a chair body 12 by means of two ball bearings 13, 14. It is also possible to use a two-row ball bearing or a plain bearing if this is only given sufficient breadth safely to carry the shaft in consideration of the bending moments which are caused by the fitting of the wheel.

The shaft 10 projects from the bearing, at both sides thereof and on the end which is turned towards the center of the chair, there is non-rotatably attached a brake drum, 15. In the drum there is fitted brake shoes which are only indicated at 16 and which are engageable by means of a lever 17, which is controlled in a suitable manner by the patient or by the person, who is pushing the wheel chair.

The wheel, which is provided with a rim and a pneumatic tire (not shown) is indicated as a number of spokes 18, which in a known manner are connected to a hub 19. To the center portion of the hub is welded a bushing 22, the inner diameter of which corresponds to the outer diameter of the shaft. It is thereby possible to push the entire wheel unit onto the shaft. The bushing 22 is so long that it, from the bottom of a counter-sunk hub portion 20, which is turned away from the chair, projects somewhat outside the bottom of an opposite counter-sunk hub portion 21. The shaft 10 is provided with a number of radially projecting pins 23, which cooperate with grooves 24 in the bushing 22, and thus transfer the rotation of the wheel to the shaft and thereby also to the brake drum 15. The outwardly projecting end of shaft 10 is sufficiently long to reach through the wheel hub into the counter-sunk portion 20. The shaft end is threaded and cooperates with a nut 25, which, in fitted position, lies entirely within the counter-sunk portion 20.

The wheel thus will be non-rotatably connected to the shaft and there will thus be no rotational movement between the separate parts of the hub.

The wheel shaft is tubular and it is possible to connect the two shafts 10 of the wheel chair by means of a bar or rod 26, which is shown in dash and dot lines in the drawing and which is freely rotatable in one of the shafts 10 and non-rotatably fixed to the other shaft 10 by means of e.g., a driver in the form of a screw 27 which is fitted at the brake drum and can be tightened against the bar 26. A patient who has injured one arm thereby in a known manner can drive the wheelchair from one side of the chair only, and near said wheel is located a guide wheel 28 which is fixedly connected to the bar, which guide wheel together with the chair wheel or any of these wheels separately may be worked by the patient's sound arm. During a possible wheel exchange, the nut 25 and possibly also the screw 27 are unscrewed whereupon the wheel is pulled off the shaft, which together with the brake drum will remain in the bearing.

There is normally one brake mechanism and one brake lever for each wheel, by which the patient is enabled to steer the chair.

The lever 17 which acts upon the brake shoes can be controlled by means of one or two separate means of which one is within reach of the patient while the other control means is fitted to the back of the chair where it is accessible to a nurse.

What I claim is:

1. A device for fitting a brake-provided wheel in an easily detachable manner to a wheel chair or a similar transport means having a load-carrying body, comprising a bearing assembly mounted to the load-carrying body, a tubular wheel shaft rotatably supported in said bearing assembly, said wheel shaft having opposite ends, a brake mechanism non-rotatably fitted to one end of said tubular wheel shaft, and a wheel hub non-rotatably yet detachably fitted to the opposite end of said tubular wheel shaft.

2. The device as claimed in claim 1 wherein a bushing is fixed to the wheel hub, said bushing at one end having at least one axial slot, with the tubular wheel shaft being provided with at least one radially projecting pin designed to engage in said slot.

3. The device as claimed in claim 1 in which the wheel hub is provided with an enlarged end portion constituting an annular space around the shaft end, said space being intended to receive a nut which can be screwed onto a threaded shaft end for securing the wheel hub to the wheel shaft.

4. The device as claimed in claim 1 in which a rod is rotatably enclosed by the tubular wheel shaft, said rod being designed to be connected to a second wheel shaft, which is fitted to the wheel chair side opposite to the first-named wheel shaft.

* * * * *